US009171058B2

(12) United States Patent
Ma et al.

(10) Patent No.: US 9,171,058 B2
(45) Date of Patent: Oct. 27, 2015

(54) DATA ANALYZING METHOD, APPARATUS AND A METHOD FOR SUPPORTING DATA ANALYSIS

(75) Inventors: Li L. Ma, BeiJing (CN); Yue Pan, BeiJing (CN); Zhao Ming Qiu, BeiJing (CN); Guo Tong Xie, Xi Er Qi (CN); Yang Y. Yang, BeiJing (CN)

(73) Assignee: International Business Machines Corporation, Armonk, NY (US)

( * ) Notice: Subject to any disclaimer, the term of this patent is extended or adjusted under 35 U.S.C. 154(b) by 1973 days.

(21) Appl. No.: 11/691,671

(22) Filed: Mar. 27, 2007

(65) Prior Publication Data

US 2007/0294269 A1 Dec. 20, 2007

(30) Foreign Application Priority Data

Jun. 16, 2006 (CN) .......................... 2006 1 0092849

(51) Int. Cl.
*G06F 17/30* (2006.01)
(52) U.S. Cl.
CPC ................................ *G06F 17/30604* (2013.01)
(58) Field of Classification Search
CPC ................................................ G06F 17/30604
USPC ................................ 707/100–104.1, 795, 796
See application file for complete search history.

(56) References Cited

U.S. PATENT DOCUMENTS

| 6,604,110 B1* | 8/2003 | Savage et al. ................. 707/102 |
| 2005/0120051 A1 | 6/2005 | Danner et al. |
| 2005/0262108 A1* | 11/2005 | Gupta .......................... 707/100 |
| 2006/0007731 A1 | 1/2006 | Dumitru et al. |

FOREIGN PATENT DOCUMENTS

EP 0895169 2/1999

* cited by examiner

*Primary Examiner* — Huawen Peng
(74) *Attorney, Agent, or Firm* — Schmeiser, Olsen & Watts, LLP; John Pivnichny

(57) ABSTRACT

A data analyzing method, apparatus, and a method for supporting data analysis includes creating or storing a semantic entity repository, wherein the semantic entity repository includes a structured entity set of entities and properties thereof, reference ranges describing the possible values of the properties, and the mappings between the entities and properties and a data structure of a data warehouse. When aggregating data, the entities, properties, and/or property values to be analyzed are selected from the semantic entity repository, and how to calculate at least one measure is defined. The data corresponding to the selected entities, properties, and property values are loaded from the data warehouse according to the mappings, and the at least one measure as defined is calculated.

19 Claims, 11 Drawing Sheets

DATA ANALYZING METHOD, APPARATUS AND A METHOD FOR SUPPORTING DATA ANALYSIS

CROSS-REFERENCE TO RELATED APPLICATIONS

This application claims priority from Chinese Patent Application Serial No. 200610092849.1 filed Jun. 16, 2006.

FIELD OF THE INVENTION

This invention relates generally to the field of data processing systems, and more particularly to a technique for processing data which simplifies the process of constructing an OLAP (OnLine Analytical Processing) data analysis model, as well as eliminating dependence on any time-dependent dimensions.

BACKGROUND OF THE INVENTION

Data processing systems such as the OLAP (OnLine Analytical Processing) System has been growing in popularity due to the increase in data volumes of information in business and the recognition of the value of business analysis. OLAP data processing provides a multidimensional conceptual view of the data, including full support for hierarchies, which is the most natural way to analyze businesses. For instance, an OLAP data processing model for sales evaluation can be organized as two dimensions: "geography" and "time." A time dimension might contain levels of year, month, and day. Similarly, a geography dimension can represent country, state, and county or the like.

The OLAP System organizes facts in terms of dimensions which are ways that the facts can be categorized for analysis. OLAP data analysis system is a valuable and rewarding business intelligence tool in helping evaluate balanced scorecard targets, producing reports etc. This data analysis process allows users to find the rules and trends in the data, such as the most popular products purchased by certain group of people or in a certain region, and the sales results of a company or an industry.

To this end, OLAP data processing organizes the data according to dimensions in such a way that a so-called "cube" is created. An OLAP data cube is not strictly three-dimensional geometrically, but can have multiple dimensions greater or fewer than three dimensions. In other words, the term "data cube" is used just for the convenience of understanding and description. Its essence is to organize the data in multiple dimensional representation. Once the dimensions, which depend on the subjects to be analyzed and the analysis object, are determined, the frame of a data cube is formed. If the data cube happens to be three-dimensional and is represented with a chart or a drawing, then a visible cube can be obtained.

A data cube can be developed according to business units such as sales or marketing. A data cube may convert data into usable information by allowing data aggregation. With a data cube, a business user can slice and dice data at will according to the requirements of a business analysis.

In a word, OLAP data processing is valuable because of its flexibility and powerful business analysis ability. Once the facts and dimensions are defined within an OLAP data analysis server, data processing tools provide an easy way to analyze data by simply dragging and dropping dimensions and facts.

Currently, the method of constructing an OLAP data analysis model is to directly define the dimensions and measures that a data cube should have. Such a method only focuses on defining what dimensions are needed and ignores the relationship and structure existing among the dimensions. Moreover, it is hard for business people to reuse these dimensions. People may have to try very hard to find all useful dimensions for analysis when they design a data cube. What further complicates the problem is that there may be some dimensions which are time-dependent, e.g., the credit rating of a company. Most of the existing data analysis systems can not obtain correct analysis results when processing data cubes with time-dependent dimensions.

SUMMARY OF THE INVENTION

Briefly stated, a data analyzing method, apparatus, and a method for supporting data analysis includes creating or storing a semantic entity repository, wherein the semantic entity repository includes a structured entity set of entities and properties thereof, reference ranges describing the possible values of the properties, and the mappings between the entities and properties and a data structure of a data warehouse. When aggregating data, the entities, properties, and/or property values to be analyzed are selected from the semantic entity repository, and how to calculate at least one measure is defined. The data corresponding to the selected entities, properties, and property values are loaded from the data warehouse according to the mappings, and the at least one measure as defined is calculated.

According to an embodiment of the invention, a data analyzing method includes the steps of: creating a semantic entity repository comprising (a) a structured entity set of entities and properties thereof; (b) reference ranges describing possible values of said properties; and (c) a plurality of mappings between said entities, said properties, and a data structure of a data warehouse; selecting, from said semantic entity repository, entities, properties and/or property values to be analyzed; defining how to calculate at least one measure; loading, from said data warehouse, a plurality of data corresponding to the selected entities, properties, and property values according to said mappings; and calculating at least one of the defined measures.

According to an embodiment of the invention, a data analyzing apparatus includes storage means for storing a semantic entity repository, wherein the storage means includes (a) a structured entity set of entities and properties thereof; (b) a plurality of reference ranges describing possible values of said properties; and (c) a plurality of mappings between said entities and properties and a data structure of a data warehouse; selecting means for selecting, from said semantic entity repository, entities, properties and/or property values to be analyzed; measure-defining means for defining how to calculate at least one measure; data loading means, for loading, from said data warehouse, data corresponding to the selected entities, properties, and property values according to said mappings; and means for calculating at least one of the defined measures.

According to an embodiment of the invention, a method for configuring a data analyzing apparatus for a user includes the steps of providing storage means for storing a semantic entity repository, wherein the semantic entity repository includes (a) a structured entity set of entities and properties thereof; (b) reference ranges describing possible values of said properties; and (c) a plurality of mappings between said entities and properties and a data structure of a data warehouse; providing selecting means for selecting, from said semantic entity repository, entities, properties and/or property values to be analyzed; providing measure-defining means for defining how to calculate at least one measure; and providing data loading means for loading, from said data warehouse, the data corresponding to the selected entities, properties, and property values according to said mappings, and calculating at least one of the defined measures.

According to an embodiment of the invention, a program product includes program codes stored in a computer readable storage medium, wherein the program codes implement the steps of: (a) creating a semantic entity repository comprising (i) a structured entity set of entities and properties thereof; (ii) reference ranges describing possible values of said properties; and (iii) a plurality of mappings between said entities, said properties, and a data structure of a data warehouse; (b) selecting, from said semantic entity repository, entities, properties and/or property values to be analyzed; (c) defining how to calculate at least one measure; (d) loading, from said data warehouse, a plurality of data corresponding to the selected entities, properties, and property values according to said mappings; and (e) calculating at least one of the defined measures.

The present invention simplifies the process of constructing an OLAP data analysis model, as well as eliminating dependence on a time-dependent dimension which leads to an incorrect result. A time-dependent dimension may be marked, and a mapping to the data warehouse for tracking the time-dependent variation of the dimension may be defined, and an adjusting item reflecting said variation may be incorporated into the calculation of any measure relating to the time-dependent properties. Thus, when loading data, the aggregation based on entities may easily support aggregation of the time-dependent dimension(s), thus avoiding incorrect results due to incorrect handling of time-dependent dimension(s).

DETAILED DESCRIPTION OF THE PREFERRED EMBODIMENT

Figure 1:
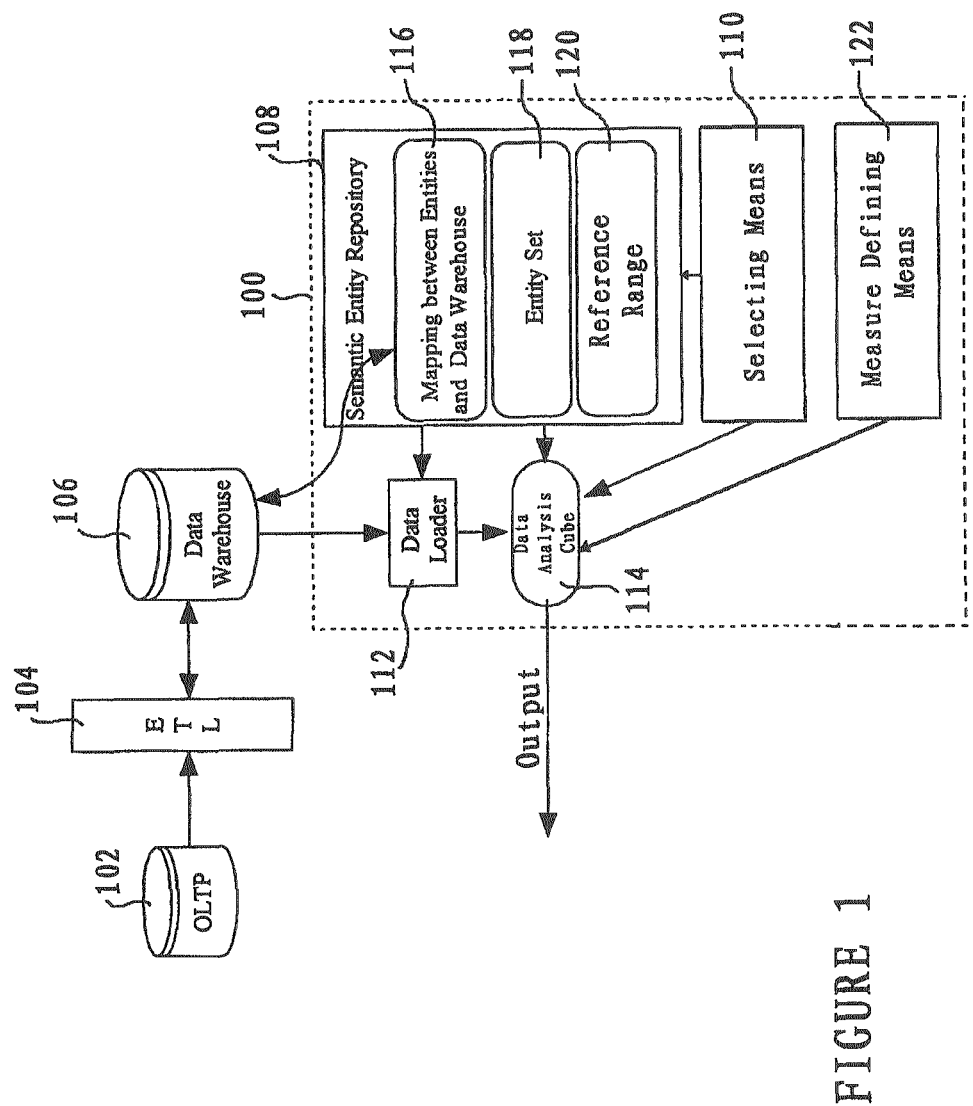
FIG. 1 shows a block diagram of a system including an embodiment of the data analysis apparatus according to the invention.

The application provides a new method and a new apparatus for constructing a data analysis and reporting system based on semantic technology. FIG. 1 is a schematic diagram showing the overall configuration of a data analysis system, in which the method and apparatus of the invention may be applied. As shown in FIG. 1, the data to be analyzed originates from an OLTP (On-Line Transaction Processing) system 102 and is "washed" clean by an ETL (Extraction, Transformation, and Loading) system 104 after which it is stored in a data warehouse 106.

As mentioned in the Background, the existing prior art method for constructing a data analysis model is implemented through directly defining the dimensions and measure(s) in a data cube. Such a method only focuses on defining what dimensions are needed, but ignores relationships between the dimensions and the structure of the dimensions. Moreover, it is hard for business people to reuse these dimensions. People may have to try very hard to find all useful dimensions for analysis when they design the cube. For solving the problem, the basic idea of the present invention is to provide a predefined repository in which possible dimensions are stored, so that it suffices for a user to simply select desired dimensions from the repository. For facilitating the definition and use of the repository of the dimensions, the invention adopts semantic technology.

The data analysis apparatus is now be described in detail. A data analysis apparatus 100 according to the invention includes four main components: an SER (Semantic Entity Repository) 108, selecting means 110, measure-defining means 122, and a data loader 112 for loading data into a data cube from the data repository. These components are described below.

Figure 2:
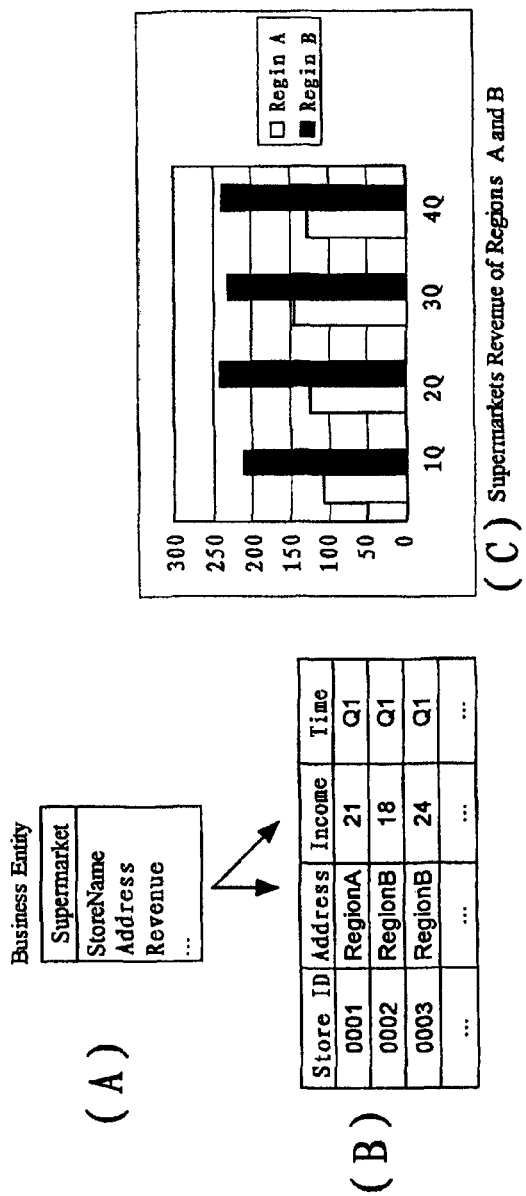
FIG. 2 shows a schematic diagram for explaining the entities, the data warehouse, and the data cube.
Figure 10:
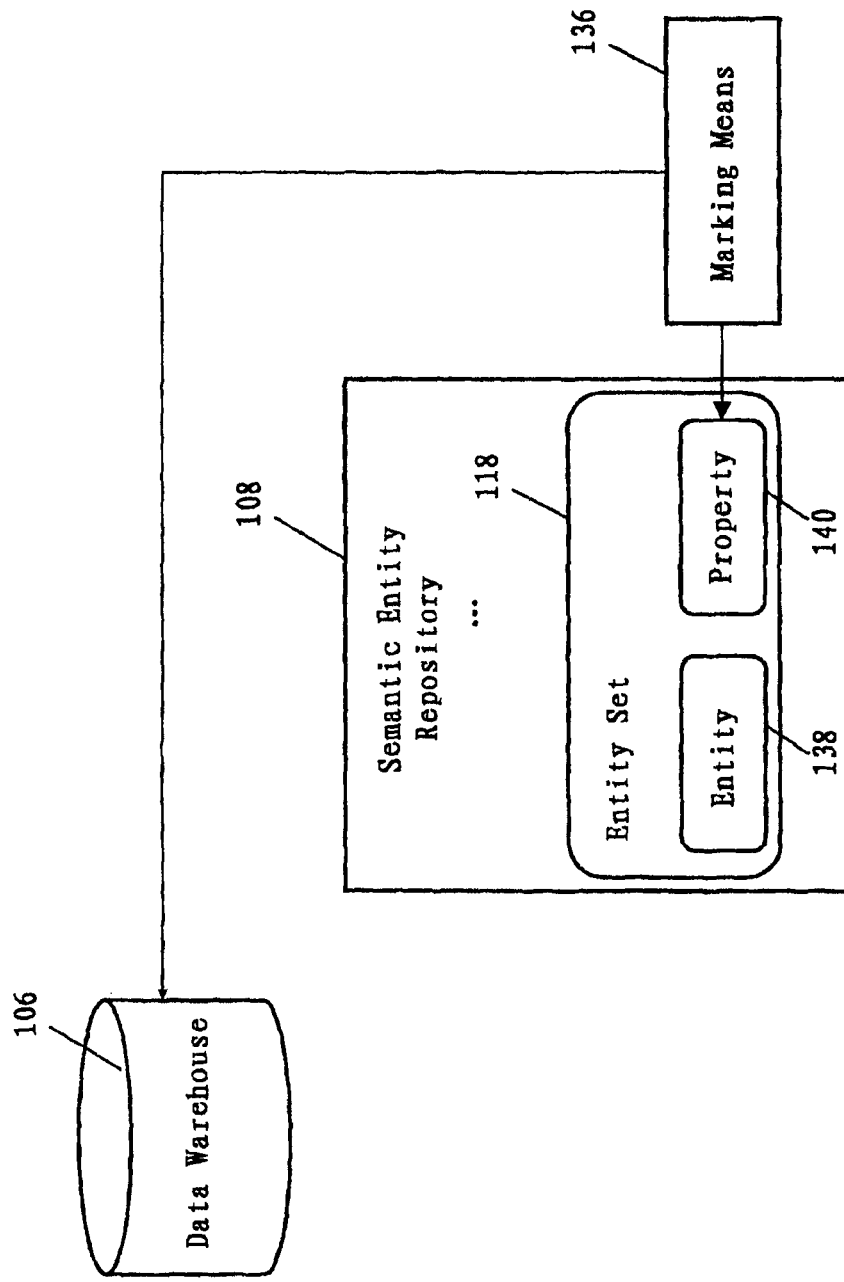
FIG. 10 shows a schematic diagram showing another preferred embodiment of the data analysis apparatus according to the invention.

Referring also to FIGS. 2 and 10, each data cube involves many business entities. Every entity represents an object to be analyzed. For example, "Supermarket" is the entity to be analyzed in a simple data analysis system showing all supermarkets' revenue of regions A and B. SER 108 is a library in which business entities that are related to the data analysis are stored. It preferably includes three main components: an entities set 118 consisting of structured entities 138 and their properties 140; a set of predefined reference ranges 120 for describing the possible range of each property; and a mapping 116 between SER entities 138, properties 140, and data structures of the data warehouse 106, which enable data retrieval when conducting data aggregation.

The function of SER 108 is to provide reference and enhance reusability when designing data cubes. By customizing relevant entities 138 and their properties 140 in SER 108, a user can conveniently define any data analysis model he wants.

Figure 3:
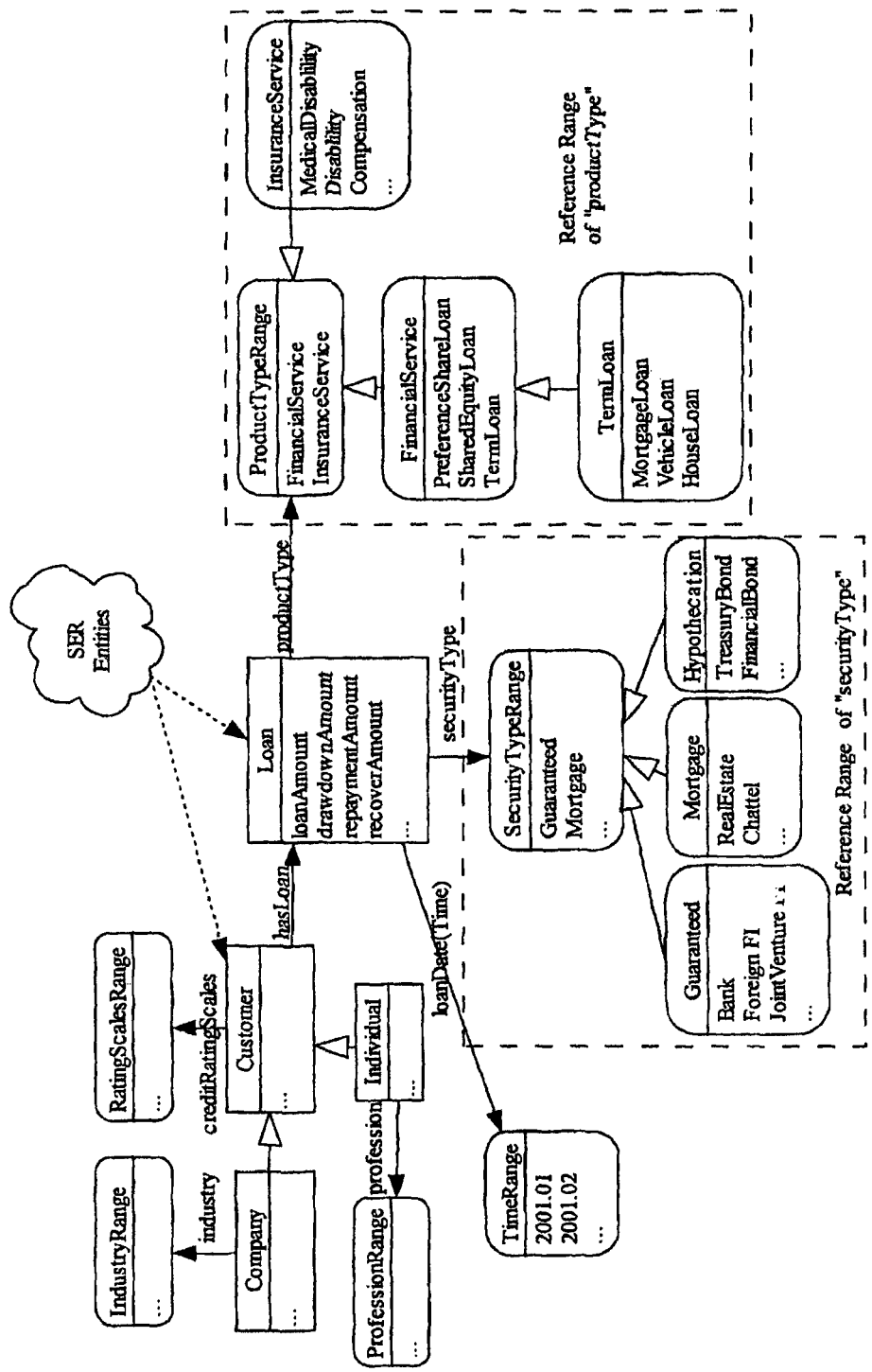
FIG. 3 shows an example of the semantic entity repository (SER).

Referring to FIG. 3, an entity 138 in SER 108 preferably represents a business concept, for example. An entity 138 can have a number of properties 140. Properties 140 of an entity 138 in SER 108 can have three kinds of functions. The first kind of function is to maintain logical relationships among business concepts, such as "hasLoan" which indicates the relationship between the concepts "Customer" and "Loan." The second kind of function the properties 140 can have is to act as "dimension" of a data cube, such as "creditRatingScales" of "Customer." If a property is selected to be a dimension, we call this property a dimension property. The value range of a dimension property is called the reference range of the property. Every value in the reference range is taken as a coordinate point of the dimension. Properties can also be used to define measures of data cubes. Measures are described later below.

SER entities 138 are optionally organized as a hierarchy. An entity 138 can inherit the properties from its ancestors. For example, the entity which represent business concept "Customer" is a parent concept of "Company" and "Individual". Therefore the "Company" and "Individual" inherit the properties "creditRatingScales" and "address" from the entity "Customer." As examples, from FIG. 3 throughout to FIG. 6, a white-headed arrow shows that the corresponding properties can be inherited, while a black-headed arrow shows that the corresponding properties can not be inherited.

The reference range of a dimension property consists of all possible values of that dimension property.

Another important component of SER 108 is the mapping between SER 108 entity properties 140 and data warehouse 106. The role of mapping is to specify where the instances of entities 138 and their properties 140 are stored in data warehouse 106. In particular, a mapping for an entity 138 preferably points to the primary key of a table which stores instances of entity 138; while a mapping for a property 140 points to the column in which the property values of instances are saved.

Through mapping, the system can automatically find out where to retrieve data from data warehouse 106 when aggregating a data cube.

FIG. 3 shows an example of SER 108 with entities 138 and reference ranges 120, displayed on a graphic user interface. It may be represented in OWL (Web Ontology Language, a standard recommended by the W3C (World Wide Web Consortium)) as below.

```
<owl:Class rdf:about="&sbst;Loan" />
<owl:Class rdf:about="&sbst;Customer" />
<owl:Class rdf:about="&sbst;Company" >
    <rdfs:subClassOf rdf:resource="&sbst;Customer" />
</owl:Class>
<owl:Class rdf:about="&sbst;Individual" >
    <rdfs:subClassOf rdf:resource="&sbst;Customer" />
</owl:Class>
<owl:ObjectProperty rdf:about="&sbst;hasLoan">
    <rdfs:domain rdf:resource="&sbst;Customer"/>
    <rdfs:range rdf:resource="&sbst;Loan "/>
</owl:ObjectProperty>
<owl:ObjectProperty rdf:about="&sbst;productType">
    <rdfs:domain rdf:resource="&sbst;ProductTypeRange"/>
    <rdfs:range rdf:resource="&sbst;Loan "/>
</owl:ObjectProperty>
<owl:DatatypeProperty rdf:about="&sbst;loanAmount">
    <rdfs:domain rdf:resource="&sbst;Customer"/>
    <rdfs:range rdf:resource="http://www.w3.org/2001/
    XMLSchema#float"/>
</owl:DatatypeProperty>
<owl:Class rdf:about="&sbst;ProductTypeRange" />
<owl:Class rdf:about="&sbst;FinancialService" >
    <rdfs:subClassOf rdf:resource="&sbst;ProductTypeRange" />
</owl:Class>
<owl:Class rdf:about="&sbst;TermLoanRange" />
    <rdfs:subClassOf rdf:resource="&sbst;FinancialService" />
</owl:Class>
<sbst:FinancialService rdf:about="&sbst;PreferenceShareLoan" />
<sbst:FinancialService rdf:about="&sbst;SharedEquityLoan" />
<sbst:TermLoanRange rdf:about="&sbst;MortgageLoan" />
<sbst:TermLoanRange rdf:about="&sbst;VehicleLoan" />
<sbst:TermLoanRange rdf:about="&sbst;HouseLoan" />
```

In FIG. 3, the rectangles with right-angled corners represent entities, while the rectangles with round-angled corners represent reference ranges of properties. The strings inside the reference range rectangles represent the members that directly belong to the respective reference range. For example, as shown in FIG. 3, there are four entities: Company, Customer, Individual, and Loan. Each entity has its own properties. For simplicity, only the properties of "Loan" are illustrated in detail in FIG. 3: productType, securityType, and loanDate. Each property may be further divided and has a "reference range", that is, a value range of that property. Each value in a value range may be further divided. The whole reference range of a property may therefore be organized in a tree structure. For example, in the tree structure of the reference range of the security type, the root "SecurityType" has three child nodes: "Guaranteed", "Mortgage", and "Hypothecation". And "Guaranteed" further has three child nodes: "Bank", "Foreign FI", and "Joint Venture FI."

It should be noted that a property and its reference range keep a relative relationship. As an example, although the structure shown in FIG. 3 is relatively reasonable, it is also possible to split a tree of reference range in FIG. 3 into two trees, the root nodes of which may directly serve as different properties of the entity to replace the original property. For example, the tree of "security type" in FIG. 3 may be split into two trees having root node "Guaranteed" and root node "Other Security Types", respectively, and "Guaranteed" and "Other Security Types" directly serve as properties of the entity "Loan." Furthermore, the structure of a tree may be organized according to different criteria.

Referring back to FIG. 2, measure-defining means 122 is now discussed. A measure is the target to be analyzed. For example, in the example shown in FIG. 2, the entity to be analyzed is "Supermarket" as shown in FIG. 2(A), which corresponds to the data warehouse as shown in FIG. 2(B). FIG. 2(C) shows a cube obtained from an analysis. The cube involves two entities, that is, "Supermarket" and "Revenue." The logical relation between the two entities is "Supermarket has Revenue." The cube has three dimensions as follows. The first dimension is "Time" (abscissa), which is a property of "Revenue", and the reference range of which is from the first quarter (Q1) to the fourth quarter (Q4), constituting the coordinates in the "Time" dimension, while the second dimension is "Address" (represented by different gray scales in FIG. 2(C)), which is a property of "Supermarket", and the reference range of which is "Region A" and "Region B", constituting coordinates in the "Address" dimension.

In the cube, "the total revenue in each quarter of the supermarkets in each region" is a measure to be analyzed. The measure may be calculated by adding the values in "Income" column in the data warehouse as shown in FIG. 2(B) according to the time ("Time" column) and the region ("Address" column). To get a plan view, in FIG. 2(C) the ordinate represents the measure scale, while the "Address" dimension is represented by the histogram with grayscales. As another example, the ordinate may represent another measure, such as "average revenue in each quarter of all the supermarkets in each region", when the measure may be calculated by dividing the sum obtained above by the number of supermarkets in each region.

The measure-defining means 122 is configured to define a measure. If a measure does not directly correspond to any entity or property in the SER (or values in the data warehouse), then it is necessary to define its calculation method, such as described above. In other words, once the calculation method is defined, then a measure is defined. If a measure corresponds directly to an entity or property in the SER 108 (or values in the data warehouse 106), then the latter may be directly pointed to be a measure, i.e., it may be regarded that a calculation such as "X=A" is defined. For example, for visibly displaying the behaviors of all the supermarkets, a cube may be constructed with the "Time" dimension, the "Store name (Store ID)" dimension and a measure dimension "Income in each quarter." In such a case, the measure "income in each quarter" will be directly equal to respective value in the "Income" column.

The definition of a measure and its calculation has relation to the selection of dimensions of the cube. Therefore measure-defining means 122 may also function to select desired dimensions from SER 108. The selection may be conducted through carrying out selection on the graphic user interface as shown in FIG. 3. Of course, there may also be selecting means 110 for selecting desired dimensions from SER 108, as shown in FIG. 1.

The data loader 112 is now described. Once the desired dimensions have been selected and the calculation of a measure has been defined, a data cube is constructed. Then, data loader 112 may retrieve data from data warehouse 106 according to the mapping relation defined in SER 108, load the data into the cube, conduct calculations, and display the result. Certainly, the most convenient way is to output graphic representations and make a report, but the result may also be output in any other manner, such as simply with a list.

With the data analysis apparatus as described above, it is convenient for a user to conduct data analysis by directly adopting the entities and properties pre-defined in the SER 108 as reference, without making great efforts in analyzing the concepts and creating the relations between concepts.

A data analysis method and some other preferred embodiments of the data analysis apparatus is described in detail below.

Figure 11:
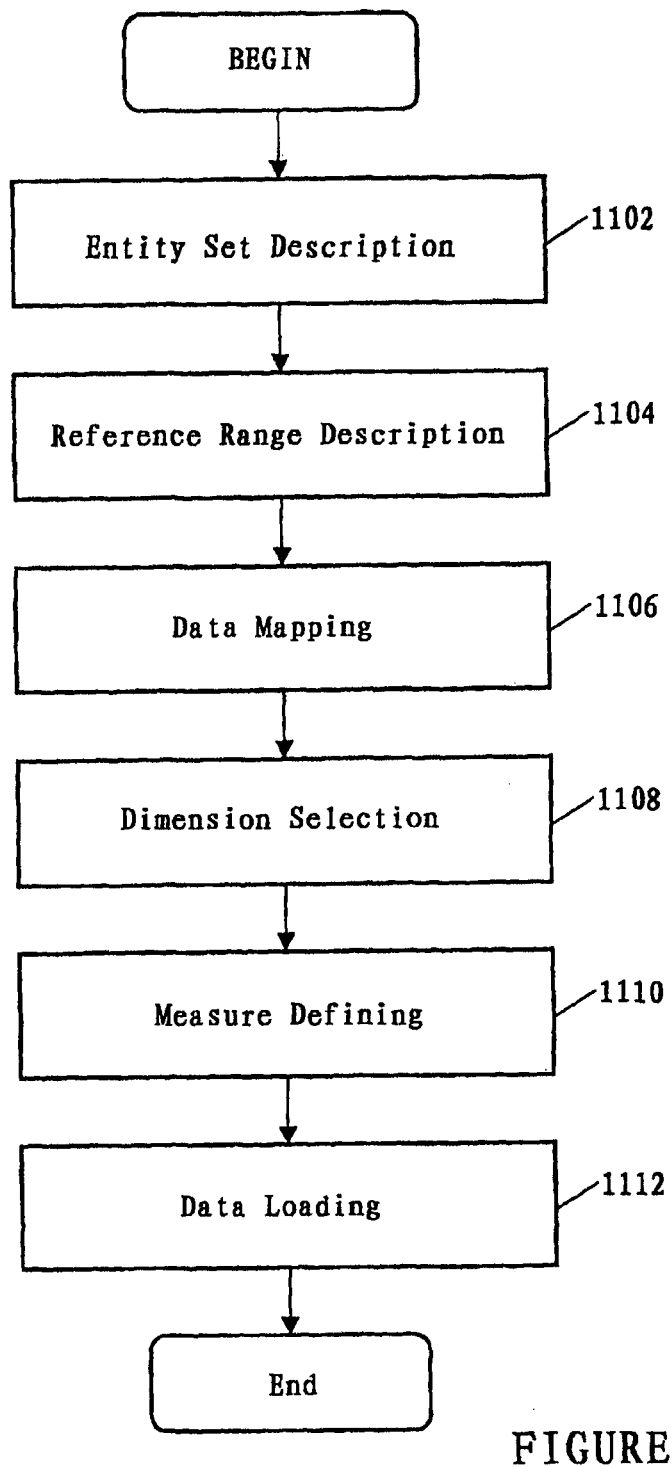
FIG. 11 shows a flowchart showing an embodiment of the data analysis method according to the invention.

Referring now to FIG. 11, the steps taken when conducting data analysis using the data analysis apparatus are described with reference to the flowchart shown in FIG. 11 and some other schematic diagrams.

First, it is necessary for a user to establish SER 108. SER 108 may be established through various ways. In the first embodiment of the data analysis method according to the invention, a basic SER 108 prepared in advance using the data analysis apparatus as described above may be adopted. That is to say, once the data analysis apparatus as described has been loaded, the building of SER 108 is complete. This embodiment requires providing a basic SER 108 which is relatively complete and perfect in advance.

In the second embodiment of the data analysis method according to the invention, the basic SER 108 might be not so perfect, so it might be preferably to modify the basic SER 108. That is to say, if the entities, properties, or the reference ranges of the properties, logical relations etc. in the basic SER 108 do not meet the requirements in practical application, or need to be enhanced, then the user may modify, add, or delete elements in the basic SER 108, thus completing the building of the SER 108.

In the third embodiment of the data analysis method according to the invention, considering the diversity of user requirements and the cost, the basic SER 108 provided by the data analysis apparatus may be an empty repository having a structure mentioned in the invention, and a user may build his/her own SER 108 according to the structure constructed by the data analysis apparatus. That may be regarded as a modification of an empty repository having a specific logical structure.

Accordingly, in a preferred embodiment of the data analysis apparatus according to the invention, the data analysis apparatus further includes modifying means for modifying the SER contents through creating, modifying or deleting entities, properties, reference ranges of properties or the like.

Figure 9:
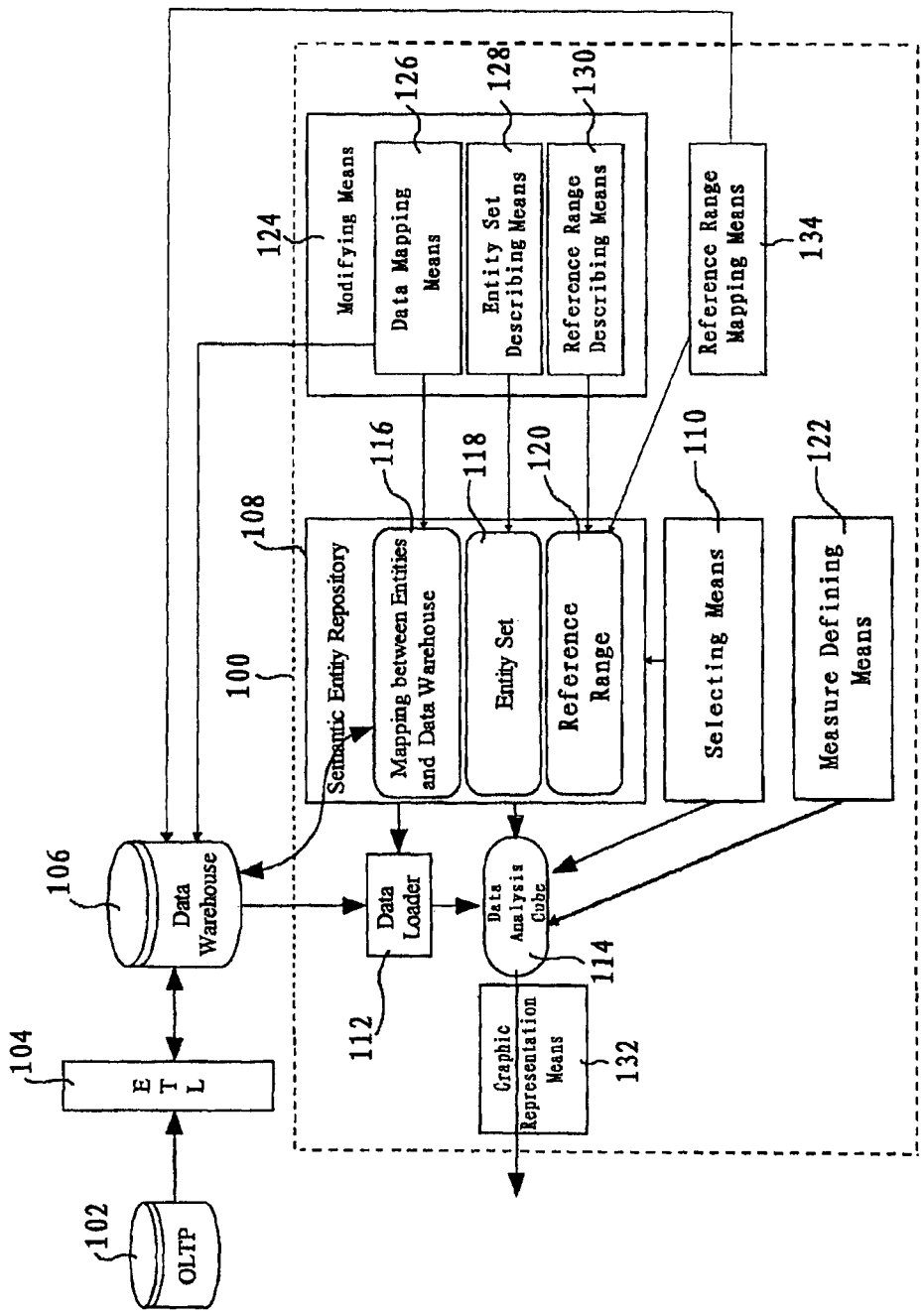
FIG. 9 shows a block diagram showing a system including several preferred embodiments of the data analysis apparatus according to the invention.

As shown in FIG. 9, in a preferred embodiment of the data analysis apparatus 100 according to the invention, the data analysis apparatus 100 optionally further includes modifying means 124, which further optionally includes entity set describing means 128 for adding, deleting, or modifying the entities and properties thereof in the entity set; reference range describing means 130 for describing or modifying the reference range of possible values of properties; and data mapping means 124 for creating, deleting or modifying mapping between the entities and properties thereof on one hand and the data structure in the data warehouse on the other hand.

Correspondingly, in terms of said second and third embodiments of the data analysis method, as shown in FIG. 11, the repository creating step of the data analysis method comprises an entity set describing step 1102, a reference range describing step 1104, and a data mapping step 1106. It should be noted that the description of the reference range of a property of an entity should be based on the description of the property, which should further be based on the description of the entity. In addition, data mapping should be based on the descriptions of entities, properties thereof, and reference ranges. Therefore, in terms of a certain property of a certain entity, the logical sequence of the three steps should be the sequence as mentioned above. However, for a plurality of entities and properties, the three steps may be performed alternately.

It should be further noted that the creation of SER 108 is the groundwork before a specific data analysis can be done, but it is not necessary that it be done immediately before the steps of dimension selection, measure defining, and data loading, which will be described later. However, during a specific data analysis, it might be discovered that the SER needs to be modified or supplemented. In such a case, the SER creation step will be interleaved with the steps described below.

Referring still to FIG. 11, the next step is a dimension-selecting step 1108 and a measure-defining step 1110. In the dimension-selecting step 1108, selecting means 110 (FIG. 1) is adopted to select from the SER 108 entities and properties for dimensions and property value ranges for the coordinates on respective dimensions. In the measure-defining step 1110, the measure defining means 122 is adopted to define a measure and its calculation.

As mentioned before, in another preferred embodiment of the data analysis method according to the invention, if it is discovered in the dimension selecting step 1108 and/or measure-defining step 1110 that there is no desired entity, properties, or property value ranges, they may be created by the entity set describing means 128, reference range describing means 130, and data mapping means 124 (all in FIG. 9). The selected entities are used as basic aggregating elements and the properties that are selected as dimension properties are used as dimensions.

Figure 4:
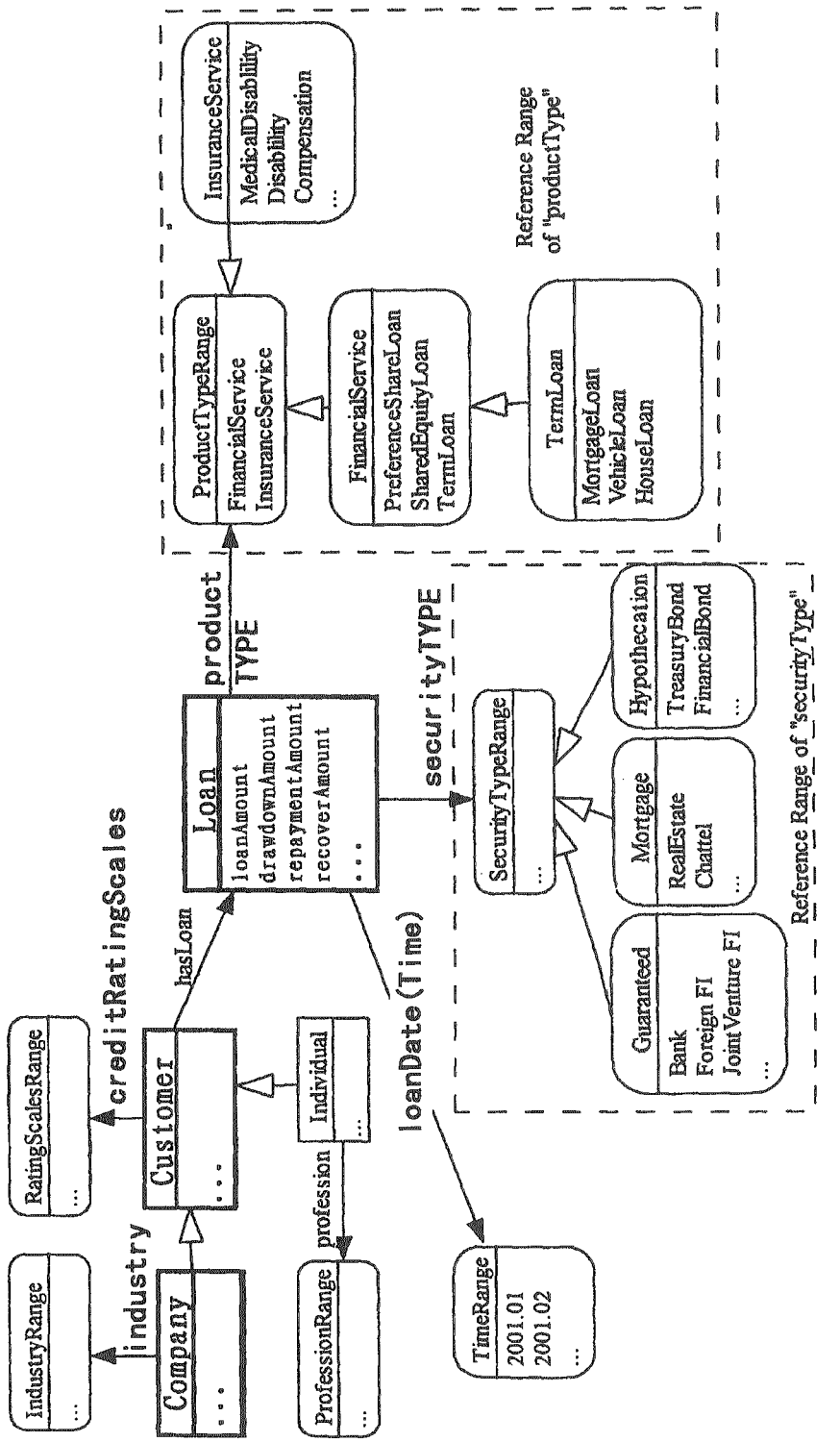
FIG. 4 shows an example of selecting entities and properties from the SER as depicted in FIG. 3.

FIG. 4 shows an example of choosing entities and their properties on a graphic user interface as shown in FIG. 3. The highlighted rectangles (bold line rectangles) in the drawing denote the entities that have been selected and the highlighted words (in bold) denote the properties that have been chosen.

Where the entities and the properties thereof have been selected, the dimensions of the data analysis are determined. For example, the selection result in FIG. 4 constitutes five dimensions for the scenario that "Company" is "Customer" which borrowed money (having "Loan"): the industry section that the company belongs to, the credit rating scale of the customer, and the "product TYPE", "security TYPE" and "loanDate" of the "Loan."

The next step is to select possible values for the dimension properties. This step can be done by customizing reference ranges for the dimension properties in Semantic Entity Repository (SER) 108 with the selecting means 110, that is, by conducting selection from the reference range.

In another preferred embodiment of the data analysis method of the present invention, a situation may be considered in which the real range of a dimension property is not identical with the reference range as specified. In such a case, the user may define value-mapping between the real range and the reference range. For example, the real range of the property "loanAmount" of the entity "Loan" is real numbers, while the reference range thereof can be defined as {large-Num, smallNum}. In such a case, a value-mapping is needed to convert the real numbers to "largeNum" and "smallNum." Accordingly, another preferred embodiment of the data analysis apparatus 100 may further include reference range mapping means 134 (FIG. 9), for mapping the real value range of a property to the corresponding reference range defined in the SER 108.

Figure 5:
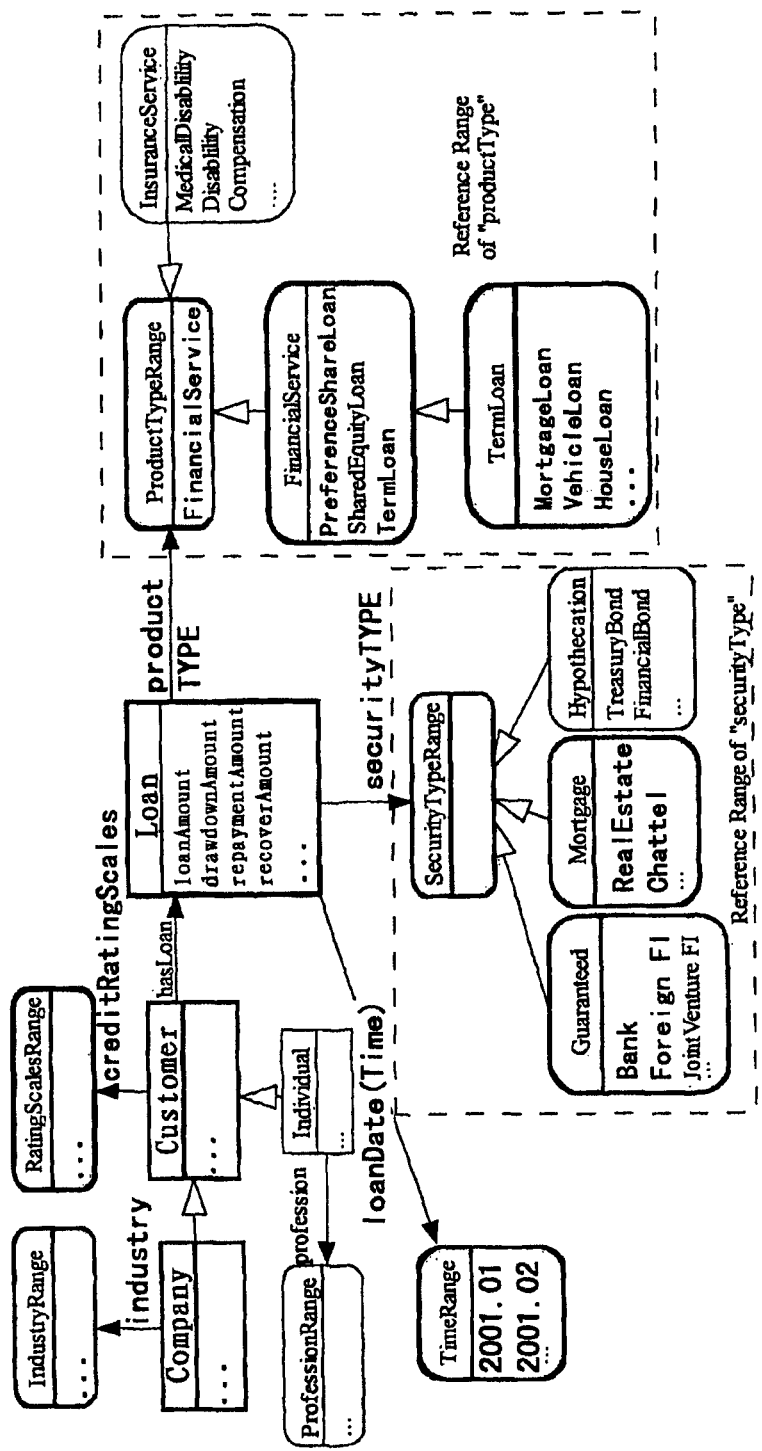
FIG. 5 shows an example of selecting the reference ranges of properties on the basis of FIG. 4.

FIG. 5 shows an example of customizing the reference ranges of dimension properties on the graphic user interface shown in FIG. 3.

Referring still to FIG. 11, the next step is measure defining 1110, i.e., to define measures and their calculations with the measure-defining means 122. A measure represents data values to be evaluated in data analysis, as discussed above. To define measures for data analysis, a user can use properties of entities and some predefined statistical functions to define how to calculate a measure. For example:

TotalLoanAmount=sum of "loanAmount"
TotalRepayment=sum of "repaymenAmount"
AverageLoanAmount=TotalLoanAmount/num of "Customer"
AverageRepayment=TotlRepayment/num of "Customer"

Once the entities, properties and the value ranges thereof have been selected and the measure(s) and the calculation thereof have been defined, the logical construction of the data cube 114 is completed, as discussed before. The SER 108 already contains the logical relations among the entities, properties and the value ranges thereof, and the calculation of the measure(s), that is, the relation between the measures on one hand and the selected entities, properties and value ranges on the other hand, has been defined. That is, the selected entities, properties and value ranges thereof and the measure(s) as defined constitute a unique set with determined internal logic relations.

However, in a preferred embodiment, for making the set visible and easy to understand, the set may be rendered as a graphical data cube to be displayed on a graphic user interface. To this end, the data analysis apparatus may further include graphical representation means 132 (FIG. 9) to conduct rendering and display. Specifically, the graphical representation means extracts all those properties that have been selected as dimension properties, converts each dimension property to a dimension of the data cube, takes the members selected from the reference range of the dimension property as coordinates on the respective dimension, and creates the measure(s) of the data cube according to the definition of the measure(s).

Figure 6:
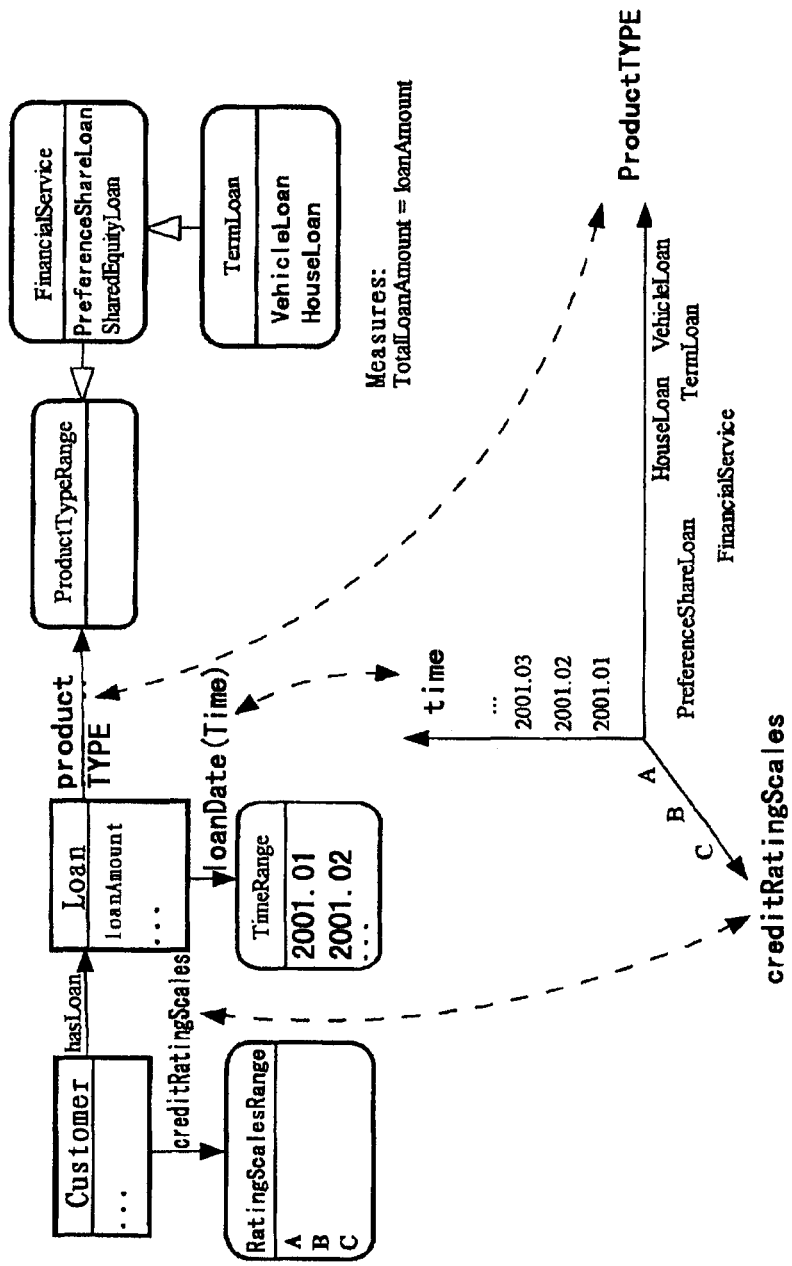
FIG. 6 shows an example of defining a measure and creating a data cube.

FIG. 6 shows an example of generating a graphical representation of a data cube, wherein for simplicity, not all the contents selected in FIG. 4 and FIG. 5 are shown. As shown in FIG. 6, the selected properties "ProductType", "CreditRatingScale", and "LoanDate(Time)" serve as three dimensions. The specific values of above properties serve as coordinates of respective dimensions. For the "ProductType", since its value range has a tree structure, the coordinates of the corresponding dimension can also be organized as a hierarchy. On that dimension (the abscissa in FIG. 6), the top-level coordinate point is just "FinancialService" (if the "InsuranceService" has also been selected in FIG. 5, then on the abscissa there may be another coordinate point "InsuranceService" to be juxtaposed with "FinancialService"), and the lower-level coordinate points are "PreferenceShareLoan" and "TermLoan." Under the "PreferenceShareLoan" there are no more lower-level coordinate points, while under the "TermLoan", there are lowest-level coordinates points "HouseLoan" and "VehicleLoan." In addition, the "CreditRatingScale" dimension may have three values A, B, and C, and the "Time" dimension has coordinate points determined according to the month (in the drawing are shown three months). In the data cube shown in FIG. 6, considering the leaf nodes of the tree structure of each value range, there are 3×3×3=27 data points in total. For example, the data point closest to the origin is "the preference share loans of the customers having the credit rating scale A in January of 2001."

Referring still to FIG. 11, the last step of the data analysis is a data loading step 1112, in which, based on the mapping between the SER 108 and the data structure of the data warehouse 106, the data loader 112 is adopted to calculate the measure(s) according to the definition of the measure(s) and load relevant data into the data cube. With the mappings between data warehouse 106 and SER 108, the data loader 112 can find out corresponding data for every entity when aggregating from the data warehouse, and calculate the measure(s) according to the definition of the calculation of each measure. For example, for the data point "the preference share loans of the customers having the credit rating scale A in January of 2001" as mentioned above, measures such as "TotalLoanAmount" and "AverageLoanAmount" may be calculated and the calculated results may be loaded into the data cube.

If the data cube is represented graphically, the graphical represent means 132 may also represent the measure(s) with graphics in each data point (not shown in FIG. 11). The graphics may be number(s), different colors, any graphics/logo with a size corresponding to the magnitude of the measure, or any combination thereof.

Time-dependent properties are now discussed. The inventor also noticed that time is a special dimension. Different events happen when the time elapses. According to a preferred embodiment of the invention, different from any conventional data analysis system, a time-dependent dimension is optionally be included when loading data into a data cube. Saying that a dimension is time-dependent means that the values of some instances for this dimension are not static, i.e., they change as time elapses. For example, the credit rating of a customer changes over time. Traditional OLAP data analysis systems can not support time-dependent dimensions, because they are based on the assumption that all the dimensions are static, thus leading to errors in the data analysis.

Figure 7:
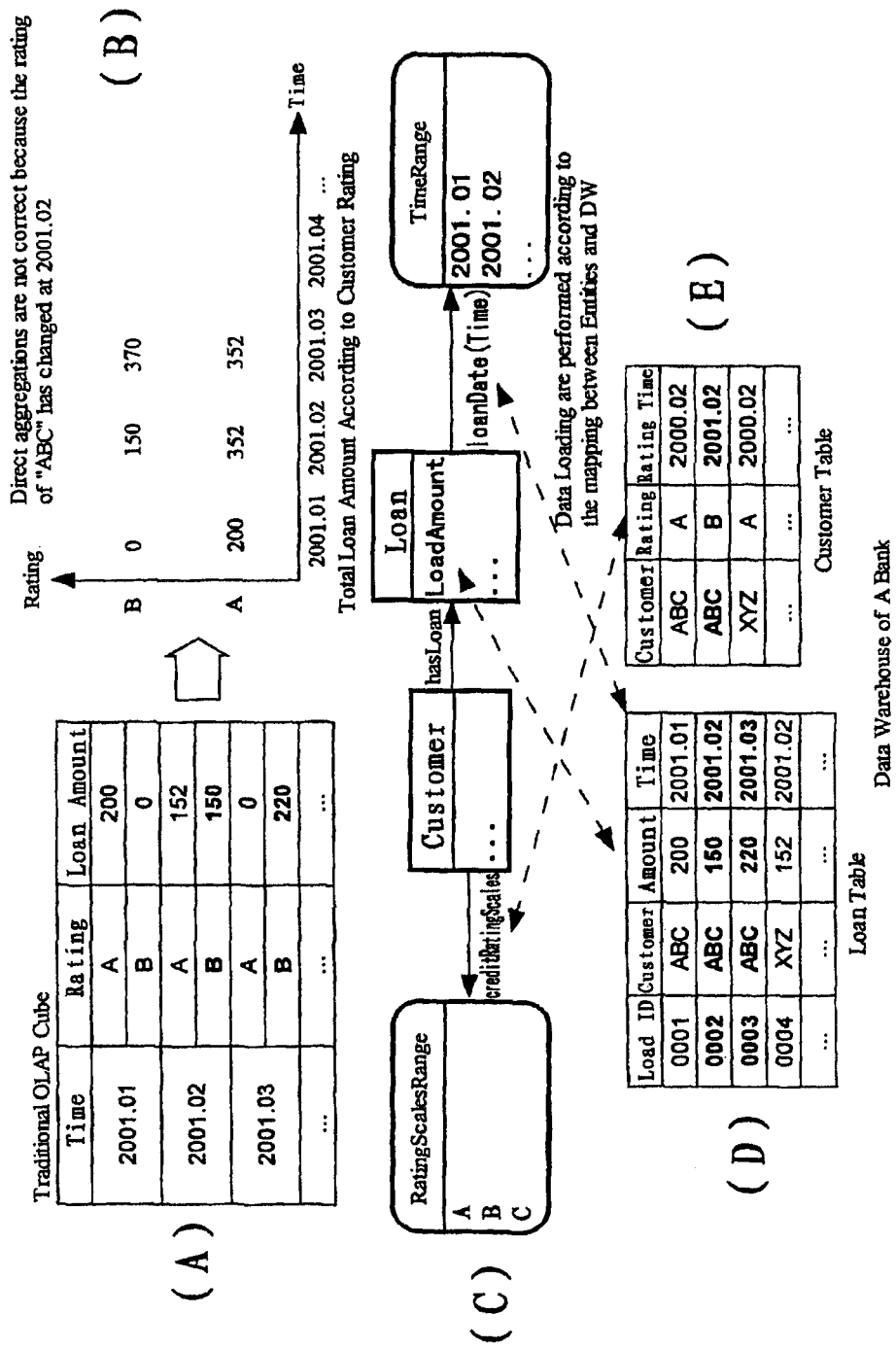
FIG. 7 shows a schematic diagram showing conventional data aggregation without considering the time-dependent variation of the properties.

For example, in the example shown in FIG. 7 for the entity "Loan" depicted in FIG. 3, (A) and (B) are data cubes based on the loan table (D) and customer table (E) in the data warehouse in a bank. (A) represents the loan amount of companies of each credit rating scale in each month, and (B) represents accumulated loan amounts of companies of each credit rating scale in each month. However, in data cube (B), it failed to consider that the rating of customer "ABC" changed from A to B in February of 2001 (FIG. 7(E)). Therefore, after 2001.02 the loans that "ABC" lent will be calculated as loans whose borrowers are rated as B. If one wants to sum up the total amount of loans that have been given to A level customers in February or March of 2001, then the money that "ABC" borrowed in January of 2001 should not be considered. The table in FIG. 7(A) comprises a "Time" column, a "Rating" column, and a "Loan Amount" column. The ratings A and B denote are a first characteristic (A) and a second characteristic (B), respectively, of the entity "Loan" and appear illustratively in the "Rating" column in FIG. 7(A). The "Time" column in FIG. 7A) depict time values $t_1$, $t_2$, and $t_3$ having numerical values of 2001.01, 2001.02, and 2001.03, respectively, such that $t_3 > t_2 > t_1$. The "Loan Amount" column in FIG. 7(A) represents "Loan Amount" as a time-dependent property having a first time-dependent component associated with the first characteristic A (i.e., associated with the rating A) and a second time-dependent component associated with the second characteristic B (i.e., associated with the rating B). The first time-dependent component has property values $A_1$, $A_2$, and $A_3$ associated with the first characteristic A at times $t_1$, $t_2$, and $t_3$, respectively, which have numerical values of 200, 152, and 0, respectively, in the "Loan Amount" column in FIG. 7(A). The second time-dependent component has property values $B_1$, $B_2$, and $B_3$ associated with the second characteristic B at times $t_1$, $t_2$, and $t_3$, respectively, which have numerical values of 0, 150, and 220, respectively, in the "Loan Amount" column in FIG. 7(A).

To support time-dependent dimensions in a data cube, a user first needs to define which dimension properties are time-dependent, and their extra mapping to data warehouse which tracks value shifts of the time-dependent properties. This can be achieved through a user interface. To this end, the data analysis apparatus 100 may further include marking means 136 (FIG. 10) configured to mark time-dependent properties 140 (dimensions), and defining the mapping for tracking the variation of the properties (as shown by double-headed arrow with dashed line in FIG. 8).

Figure 8:
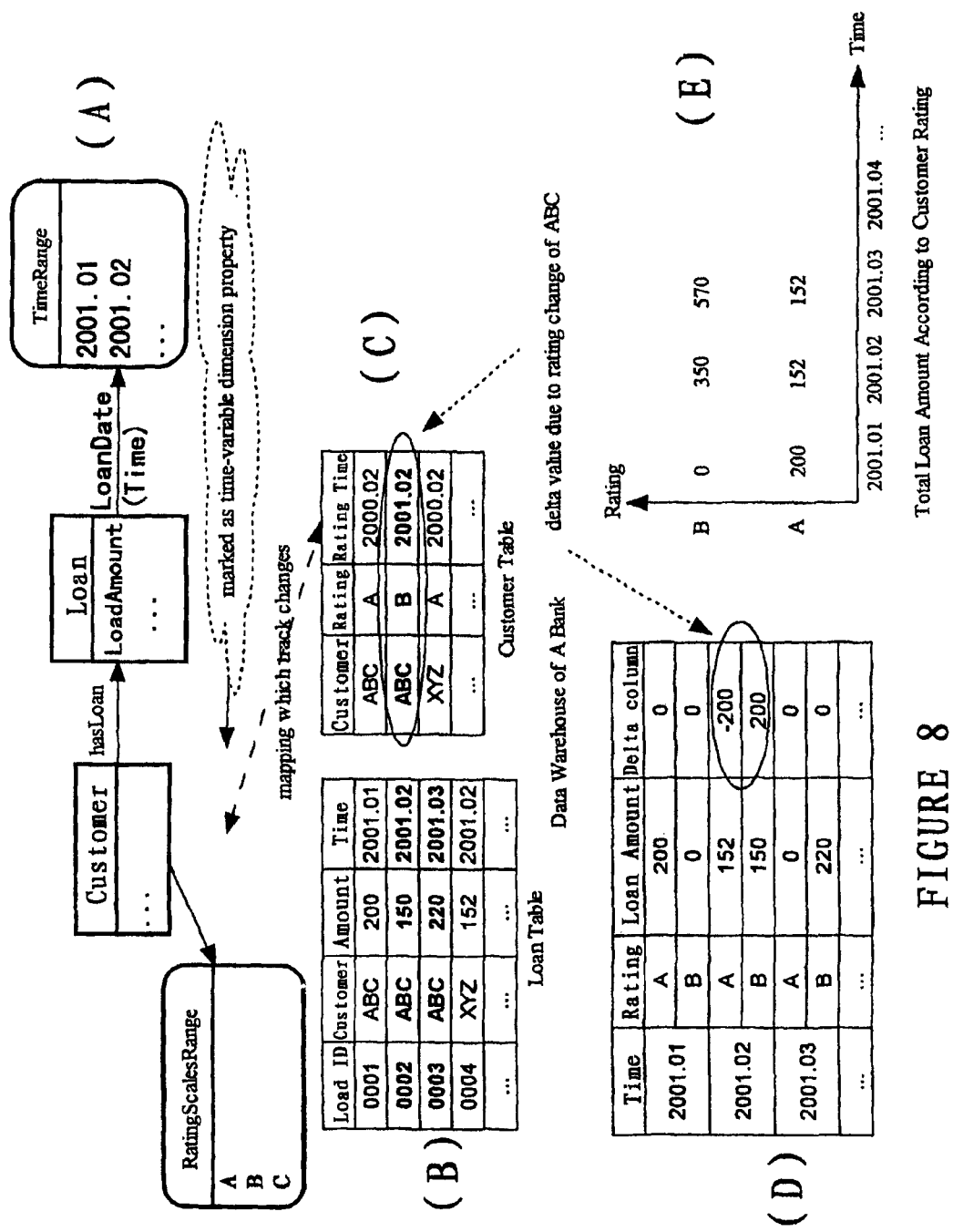
FIG. 8 shows a schematic diagram showing a preferred embodiment of the invention, in which the time-dependent feature of the properties are considered in data aggregation.

Second, an additional column is needed for every relevant measure to support aggregation over time-dependent dimensions. We call this column the delta column for the measure. The function of the column is to capture delta changes of measures brought by any time-dependent dimension whose value has changed as the time elapsed. Based on this column, we can aggregate the data correctly through use of an adjusting item having an adjustment value (A) which is numerically 200 in FIG. 8. The above operation may be performed by measure-defining means 122 in the data analysis apparatus. For example, as shown in FIG. 8(D), with respect to such measures as "accumulated total loan amount", a delta column is created. In the delta column, "−200" (i.e., −Δ) indicates that the company ABC was lowered from A level to B level in January of 2001. Therefore, the loan amount "200", which was borrowed by the company ABC when it was in A level, should be subtracted from the accumulated total loan amount of A level companies in February of 2001. Correspondingly, the loan amount "200" (i.e., Δ), which was borrowed by the company ABC when it was in the A level, should be added to the accumulated total loan amount of B level companies in February of 2001. Thus, when defining the calculation of the measure, the delta column should also be added into the sum in addition to the simple summation according to the conventional manner. Consequently, a time-dependent dimension can be aggregated correctly, and a data cube comprising said measure(s) could be calculated correctly, as shown in FIG. 2(E) in terms of the plotted measure having first component ($M_A$) for the first characteristic A (i.e., rating A) and a second component ($M_B$) for the second characteristic B (i.e., rating B), wherein $M_A$ has values $M_{A1}$, $M_{A2}$, and $M_{A3}$ and $M_B$ has values $M_{B1}$, $M_{B2}$ and $M_{B3}$, at times $t_1$, $t_2$ and $t_3$, respectively, which are calculated via the following equations: $M_{A1}=A_1$, $M_{A2}=A_1+A_2-\Delta$, $M_{A3}=A_1+A_2+A_3-\Delta$, $M_{B1}=B_1$, $B_2=B_1+B_2+\Delta$, and $M_{B3}=B_1+B_2+B_3+\Delta$. In one embodiment, the adjustment value Δ is calculated according to $\Delta=M_{A1}$. In FIG. 8(E), the numerical values of $M_{A1}$, $M_{A2}$, $M_{A3}$, $M_{B1}$, $M_{B2}$, and $M_{B3}$ calculated via the preceding equations are: $M_{A1}=200$, $M_{A2}=152$ $M_{A3}=152$, $M_{B1}=0$, $M_{B2}=350$, and $M_{B3}=570$.

A method for supporting data analysis is now described. The invention also provides a method for configuring a data analyzing apparatus for users, including steps of providing respective means of the data analysis apparatus, the respective means capable of enabling a user to use or modify an SER already created to aggregate the data in a data warehouse. Specifically, the method includes (a) providing storage means for storing a semantic entity repository which includes a structured entity set of entities and properties thereof; reference ranges describing the possible values of the properties; and the mappings between the entities and properties on one hand and the data structure of a data warehouse on the other hand; (b) providing selecting means for selecting, from the semantic entity repository, entities, properties and/or property values, to be analyzed; (c) providing measure-defining means for defining how to calculate at least one measure; (d) providing data loading means, for loading, from the data warehouse, the data corresponding to the selected entities, properties and property values according to the mappings; and (e) calculating the defined at least one measure. The SER components have already been discussed in above description in detail.

For a person skilled in the art, it is understood that any or all of the steps/components of the method and apparatus according to the invention may be implemented in the form of hardware, firmware, software, or any combination thereof in any computing equipment (including a processor and storing media etc.) or any network of computing equipments, and can be realized by the basic programming skills of any person skilled in the art having read the description of the invention, and more detailed description is omitted here.

Furthermore, in the above description, when concerning operations such as selecting, pointing, modifying, adding, deleting, defining and so on, it is obviously necessary to use a display device and an input device connected to a computing equipment, corresponding interfaces and controller software. In a word, relevant hardware and software in a computer, a computer system or a computer network, along with hardware, firmware, or software implementing the operations in the method of the invention described above, or any combination thereof, constitute the data analysis apparatus of the invention and components thereof. In that sense, the SER mentioned in the description can be understood either as a logical repository or one of the components of the data analysis apparatus of the invention.

Therefore, based on the above understanding, the invention may also include one application or one group of applications running on any information processing equipment, which may be well-known universal equipment. Therefore, the invention may also be simply a program product including program codes capable of realizing the method or apparatus as described above. That is to say, such a program product constitutes the invention, and any storing media with such a program product stored therein also constitutes the invention. Obviously, the storing medium may be any well-known storing medium or any storing medium developed in the future. Therefore it is unnecessary to list all the storing media here.

In the method and apparatus according to the invention, the components or steps may be decomposed and/or re-combined. The decomposition and/or recombination shall be regarded as equivalents of the invention.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. A data analyzing method, comprising the steps of:
creating a semantic entity repository comprising (a) a structured entity set of entities and properties thereof; (b) reference ranges describing possible values of said properties; and (c) a plurality of mappings between said entities, said properties, and a data structure of a data warehouse;
selecting, from said semantic entity repository, entities, properties and/or property values to be analyzed;
defining how to calculate at least one measure;
loading, from said data warehouse, a plurality of data corresponding to the selected entities, properties, and property values according to said mappings;
calculating at least one of the defined measures; and
marking a time-dependent property and defining mappings to the data warehouse for tracking the variation of the property, wherein said step of defining comprises incorporating an adjusting item related to said variation into the calculation of a measure related to said time-dependent property.

2. The data analysis method of claim 1, wherein the step of creating a semantic entity repository comprises the step of modifying an existing semantic entity repository, wherein at least one of said entity set, said reference ranges, and said mapping in said existing semantic entity repository is an empty set into which new elements may be added, and wherein the step of modifying an existing semantic entity repository comprises the steps of:
adding, deleting, or modifying the entities and properties thereof in said entity set;
describing or modifying the reference ranges of possible values of properties; and
creating, deleting, or modifying mappings between the entities and properties thereof and the data structure.

3. The data analysis method of claim 2, said method further comprising the step of establishing mappings between said reference range and a real value range of the data in the data warehouse if they are inconsistent with each other.

4. The data analysis method of claim 3, said method further comprising the step of generating a graphical representation of at least one of the selected entities, properties, values thereof, the defined measures, and the calculating results.

5. The data analysis method of claim 1, said method further comprising the step of establishing mappings between said reference range and a real value range of the data in the data warehouse if they are inconsistent with each other.

6. The data analysis method of claim 5, said method further comprising the step of generating a graphical representation of at least one of the selected entities, properties, values thereof, the defined measures, and the calculating results.

7. A data analyzing apparatus, comprising a processor and a computer readable memory unit coupled to the processor, said memory unit containing program code configured to be executed by the processor to implement a data analyzing method, said method comprising the steps of:
creating a semantic entity repository comprising (a) a structured entity set of entities and properties thereof; (b) reference ranges describing possible values of said properties; and (c) a plurality of mappings between said entities, said properties, and a data structure of a data warehouse;
selecting, from said semantic entity repository, entities, properties and/or property values to be analyzed;
defining how to calculate at least one measure;
loading, from said data warehouse, a plurality of data corresponding to the selected entities, properties, and property values according to said mappings;
calculating at least one of the defined measures; and
marking a time-dependent property and defining mappings to the data warehouse for tracking the variation of the property, wherein said step of defining comprises incorporating an adjusting item related to said variation into the calculation of a measure related to said time-dependent property.

8. A program product comprising a computer readable physically tangible storage device storing program code, said program code configured to be executed by a processor to implement a method, said method comprising the steps of:
creating a semantic entity repository comprising (a) a structured entity set of entities and properties thereof; (b) reference ranges describing possible values of said properties; and (c) a plurality of mappings between said entities, said properties, and a data structure of a data warehouse;
selecting, from said semantic entity repository, entities, properties and/or property values to be analyzed;
defining how to calculate at least one measure;
loading, from said data warehouse, a plurality of data corresponding to the selected entities, properties, and property values according to said mappings;
calculating at least one of the defined measures; and
marking a time-dependent property and defining mappings to the data warehouse for tracking the variation of the property, wherein said step of defining comprises incorporating an adjusting item related to said variation into the calculation of a measure related to said time-dependent property.

9. The program product of claim 8, wherein the step of creating a semantic entity repository comprises the step of modifying an existing semantic entity repository, wherein at least one of said entity set, said reference ranges, and said mapping in said existing semantic entity repository is an empty set into which new elements may be added, and wherein the step of modifying an existing semantic entity repository comprises the steps of:
adding, deleting, or modifying the entities and properties thereof in said entity set;
describing or modifying the reference ranges of possible values of properties; and
creating, deleting, or modifying mappings between the entities and properties thereof and the data structure in the data warehouse.

10. The program product of claim 9, said method further comprising the step of establishing mappings between said reference range and a real value range of the data in the data warehouse if they are inconsistent with each other.

11. The data analyzing method of claim 1,
where A denotes a first characteristic of the entities;
where B denotes a second characteristic of the entities;
wherein the time-dependent property comprises a first time-dependent component having a property value $A_1$ associated with the first characteristic A at a first time $t_1$ and a property value $A_2$ associated with the first characteristic A at a second time $t_2 > t_1$;
wherein the time-dependent property comprises a second time-dependent component having a property value $B_1$ associated with the second characteristic B at the first time $t_1$ and a property value $B_2$ associated with the second characteristic B at the second time $t_2$;
wherein the measure has a first component ($M_A$) and a second component ($M_B$);
wherein $M_A$ has a value $M_{A1}$ at the first time $t_1$ and a value $M_{A2}$ at the second time $t_2$;
wherein $M_B$ has a value $M_{B1}$ at the first time $t_1$ and a value $M_{B2}$ at the second time $t_2$;
wherein the adjusting item has an adjustment value $\Delta$;
wherein the method further comprises calculating $M_{A1}$, $M_{A2}$, $M_{B1}$, and $M_{B2}$ via $$M_{A1}=A_1,$$

$$M_{A2}=A_1+A_2-\Delta,$$

$$M_{B1}=B_1,$$

$$M_{B2}=B_1+B_2+\Delta;\text{ and}$$

wherein $\Delta=M_{A1}$.

12. The data analyzing method of claim 11,
wherein the first time-dependent component has a property value $A_3$ associated with the first characteristic A at a third time $t_3>t_2$;
wherein the second time-dependent component has a property value $B_3$ associated with the second characteristic B at the third time $t_3$;
wherein $M_A$ has a value $M_{A3}$ at the third time $t_3$;
wherein $M_B$ has a value $M_{B3}$ at the third time $t_3$; and
wherein the method further comprises calculating $M_{A3}$ and $M_{B3}$ via $$M_{A3}=A_1+A_2+A_3-\Delta,$$

$$M_{B3}=B_1+B_2+B_3+\Delta.$$

13. The data analyzing method of claim 11, wherein the method further comprises:
generating a table comprising columns and rows,
wherein the columns comprise a time column, a characteristic identifier column, a property value column, and a delta column;
wherein the rows comprise a first set of rows and a second set of rows;
wherein the first set of rows comprises the first time in the first column, an identifier of the first characteristic A and an identifier of the second characteristic B in the characteristic identifier column, $A_1$ and $B_1$ in the property value column, and zero in the delta column; and
wherein the second set of rows comprises the second time in the time column, the identifier of the first characteristic A and the identifier of the second characteristic B in the characteristic identifier column, $A_2$ and $B_2$ in the property value column, and both minus $\Delta$ and plus $\Delta$ in the delta column.

14. The data analyzing apparatus of claim 7,
where A denotes a first characteristic of the entities;
where B denotes a second characteristic of the entities;
wherein the time-dependent property comprises a first time-dependent component having a property value $A_1$ associated with the first characteristic A at a first time $t_1$ and a property value $A_2$ associated with the first characteristic A at a second time $t_2>t_1$;
wherein the time-dependent property comprises a second time-dependent component having a property value $B_1$ associated with the second characteristic B at the first time $t_1$ and a property value $B_2$ associated with the second characteristic B at the second time $t_2$;
wherein the measure has a first component ($M_A$) and a second component ($M_B$);
wherein $M_A$ has a value $M_{A1}$ at the first time $t_1$ and a value $M_{A2}$ at the second time $t_2$;
wherein $M_B$ has a value $M_{B1}$ at the first time $t_1$ and a value $M_{B2}$ at the second time $t_2$;
wherein the adjusting item has an adjustment value $\Delta$;
wherein the method further comprises calculating $M_{A1}$, $M_{A2}$, $M_{B1}$, and $M_{B2}$ via $$M_{A1}=A_1,$$

$$M_{A2}=A_1+A_2-\Delta,$$

$$M_{B1}=B_1,$$

$$M_{B2}=B_1+B_2+\Delta;\text{ and}$$

wherein $\Delta=M_{A1}$.

15. The data analyzing apparatus of claim 14,
wherein the first time-dependent component has a property value $A_3$ associated with the first characteristic A at a third time $t_3>t_2$;
wherein the second time-dependent component has a property value $B_3$ associated with the second characteristic B at the third time $t_3$;
wherein $M_A$ has a value $M_{A3}$ at the third time $t_3$;
wherein $M_B$ has a value $M_{B3}$ at the third time $t_3$; and
wherein the method further comprises calculating $M_{A3}$ and $M_{B3}$ via $$M_{A3}=A_1+A_2+A_3-\Delta,$$

$$M_{B3}=B_1+B_2+B_3+\Delta.$$

16. The data analyzing apparatus of claim 14, wherein the method further comprises:
generating a table comprising columns and rows,
wherein the columns comprise a time column, a characteristic identifier column, a property value column, and a delta column;
wherein the rows comprise a first set of rows and a second set of rows;
wherein the first set of rows comprises the first time in the first column, an identifier of the first characteristic A and an identifier of the second characteristic B in the characteristic identifier column, $A_1$ and $B_1$ in the property value column, and zero in the delta column; and
wherein the second set of rows comprises the second time in the time column, the identifier of the first characteristic A and the identifier of the second characteristic B in the characteristic identifier column, $A_2$ and $B_2$ in the property value column, and both minus $\Delta$ and plus $\Delta$ in the delta column.

17. The program product of claim 8,
where A denotes a first characteristic of the entities;
where B denotes a second characteristic of the entities;
wherein the time-dependent property comprises a first time-dependent component having a property value $A_1$ associated with the first characteristic A at a first time $t_1$ and a property value $A_2$ associated with the first characteristic A at a second time $t_2>t_1$;
wherein the time-dependent property comprises a second time-dependent component having a property value $B_1$ associated with the second characteristic B at the first time $t_1$ and a property value $B_2$ associated with the second characteristic B at the second time $t_2$;
wherein the measure has a first component ($M_A$) and a second component ($M_B$);

wherein $M_A$ has a value $M_{A1}$ at the first time $t_1$ and a value $M_{A2}$ at the second time $t_2$;
wherein $M_B$ has a value $M_{B1}$ at the first time $t_1$ and a value $M_{B2}$ at the second time $t_2$;
wherein the adjusting item has an adjustment value $\Delta$;
wherein the method further comprises calculating $M_{A1}$, $M_{A2}$, $M_{B1}$, and $M_{B2}$ via $$M_{A1}=A_1,$$

$$M_{A2}=A_1+A_2-\Delta,$$

$$M_{B1}=B_1,$$

$$M_{B2}=B_1+B_2+\Delta; \text{ and}$$

wherein $\Delta=M_{A1}$.

18. The program product of claim 17,
wherein the first time-dependent component has a property value $A_3$ associated with the first characteristic A at a third time $t_3>t_2$;
wherein the second time-dependent component has a property value $B_3$ associated with the second characteristic B at the third time $t_3$;
wherein $M_A$ has a value $M_{A3}$ at the third time $t_3$;
wherein $M_B$ has a value $M_{B3}$ at the third time $t_3$; and
wherein the method further comprises calculating $M_{A3}$ and $M_{B3}$ via $$M_{A3}=A_1+A_2+A_3-\Delta,$$

$$M_{B3}=B_1+B_2+B_3+\Delta.$$

19. The program product of claim 17, wherein the method further comprises:
generating a table comprising columns and rows,
wherein the columns comprise a time column, a characteristic identifier column, a property value column, and a delta column;
wherein the rows comprise a first set of rows and a second set of rows;
wherein the first set of rows comprises the first time in the first column, an identifier of the first characteristic A and an identifier of the second characteristic B in the characteristic identifier column, $A_1$ and $B_1$ in the property value column, and zero in the delta column; and
wherein the second set of rows comprises the second time in the time column, the identifier of the first characteristic A and the identifier of the second characteristic B in the characteristic identifier column, $A_2$ and $B_2$ in the property value column, and both minus $\Delta$ and plus $\Delta$ in the delta column.

* * * * *